(12) United States Patent
Vermeulen et al.

(10) Patent No.: US 11,697,511 B2
(45) Date of Patent: Jul. 11, 2023

(54) USE OF ADS-B DATA FOR AIRCRAFT DETAILS

(71) Applicant: KONINKLIJKE FABRIEK INVENTUM B.V., Nieuwegein (NL)

(72) Inventors: Timothy Vermeulen, Amersfoort (NL); Hans Huijsing, Ijsselstein (NL)

(73) Assignee: B/E Aerospace, Inc., Winston Salem, NC (US)

( * ) Notice: Subject to any disclaimer, the term of this patent is extended or adjusted under 35 U.S.C. 154(b) by 321 days.

(21) Appl. No.: 16/902,906

(22) Filed: Jun. 16, 2020

(65) Prior Publication Data

US 2021/0387748 A1    Dec. 16, 2021

(51) Int. Cl.
*B64F 5/60*    (2017.01)
*G08G 5/00*    (2006.01)

(52) U.S. Cl.
CPC ............. *B64F 5/60* (2017.01); *G08G 5/0026* (2013.01)

(58) Field of Classification Search
CPC ................................ B64F 5/60; G08G 5/0026
See application file for complete search history.

(56) References Cited

U.S. PATENT DOCUMENTS

| 8,686,876 | B2 | 4/2014 | Shiomori et al. |
| 9,137,123 | B2 | 9/2015 | Birkmann et al. |
| 2018/0026707 | A1* | 1/2018 | Sanders ............... G08G 5/0013 370/316 |
| 2019/0308744 | A1 | 10/2019 | Riedel et al. |

FOREIGN PATENT DOCUMENTS

| CN | 108961842 A | 12/2018 |
| JP | 2008130047 A | 6/2008 |

OTHER PUBLICATIONS

Translation of JP2008130047A (Year: 2008).*
FlightAware, Pro Stick and Pro Stick Plus, High Performance USB SDR ADS-B Receivers, https://flightaware.com/adsb/prostick/, Printed Oct. 23, 2020, 3 pages.

(Continued)

*Primary Examiner* — Shon G Foley
(74) *Attorney, Agent, or Firm* — Suiter Swantz pc llo (57) ABSTRACT

A method for combining log data generated by an appliance associated with an aircraft with flight data is disclosed. The method includes receiving an automatic dependent surveillance-broadcast (ADS-B) signal, wherein the ADS-B signal is received by a communication module communicatively coupled to the appliance. The method includes processing the ADS-B signal into a digitized data signal and correlating the digitized data signal with the log data. The method further includes combining the ADS-B data signal into the log data to create a combined data and correlating the combined data with chronological data, wherein the combined data is timestamped based on the chronological data. A system is also disclosed. The system includes an appliance configured for use in an aircraft. The system further includes a communication module communicatively coupled to the appliance configured to receive automatic dependent surveillance-broadcast (ADS-B) signals from the aircraft and send ADS-B data to the appliance.

9 Claims, 9 Drawing Sheets

(56) References Cited

OTHER PUBLICATIONS

FlightAware, PiAware, ADS-B and MLAT Receiver, https://flightaware.com/adsb/piaware/?utm_source=home&utm-medium=300x600&utm_, Printed Oct. 23, 2020, 3 pages.

Bagmare Vijendra S et al: "G3 synced time stamped ADS-B data for surveillance and data fusion application", 2017 International Conference on Wireless Communications, Signal Processing and Networking (WISPNET), IEEE, Mar. 22, 2017 (Mar. 22, 2017), pp. 1915-1919, XP033324340, DOI: 10.1109/WISPNET.2017.8300094 [retrieved on Feb. 21, 2018].

Extended Search Report for European Application No. 21179839.2 dated Dec. 7, 2021, 9 pages.

* cited by examiner

| nBits | Bits | Abbr. | Name |
|---|---|---|---|
| 5 | 1-5 | DF | Downlink Format |
| 3 | 6-8 | CA | Capability (additional identifier) |
| 24 | 9-32 | ICAO | ICAO aircraft address |
| 56 | 33-88 | DATA | Data |
| | [33-37] | [TC] | Type code |
| 24 | 89-112 | PI | Parity/Interrogator ID |

| Type Code | Content |
|---|---|
| 1-4 | Aircraft Identification |
| 5-8 | Surface position |
| 9-18 | Airborne position (w/Baro Altitude) |
| 19 | Airborne velocities |
| 20-22 | Airborn position (w/GNSS Height) |
| 23-27 | Reserved |
| 28 | Aircraft status |
| 29 | Target state and status information |
| 31 | Aircraft operation status |

USE OF ADS-B DATA FOR AIRCRAFT DETAILS

BACKGROUND

Many appliances on-board an aircraft are capable of maintaining a log that records appliance use and error messages. For example, a coffee maker may keep a log of how many cleaning cycles it has performed. In another example, an espresso maker may record an error message generated by the malfunction of a valve. These logs are useful for technicians to fix and maintain these appliances when the need arises.

While appliance logs provide pertinent information for technicians, the logs typically do not contain information pertaining to the appliance environment. For example, a technician may want to know if the appliance malfunctioned during a flight that had considerable turbulence. In another example, the technician may want to know if the appliance previously had been installed in different aircraft. Knowledge of the appliance's environment and past-history may be helpful in determining the cause of an appliance malfunction and may assist in preventing future malfunctions.

One possible solution is an add-on component for aircraft that would specifically send aircraft details and/or a timestamp directly to the appliance. However, such system would require additional infrastructure (e.g., through a retrofit) and would likely be too expensive. Another possible solution would be to have these appliances receive time and location information from a GPS signal, with identification data of the aircraft coming from a different data source. However, the GPS signal is likely too weak to be received by an aircraft appliance.

Therefore, it would be desirable to provide a system and method which cure one or more of the shortfalls of the previous approaches identified above.

SUMMARY

A system is disclosed. In one or more embodiments, the system includes an appliance configured for use in an aircraft. In embodiments, the system further includes a communication module communicatively coupled to the appliance. The communication module is configured to receive automatic dependent surveillance-broadcast (ADS-B) signals from the aircraft and send ADS-B data to the appliance. In embodiments, the communication module includes a receiving antenna. In embodiments, the communication module includes a receiver. The receiver is configured to receive the ADS-B signal and process the ADS-B signal into ADS-B data, wherein the ADS-B data is configured as a digitized output. In embodiments, the communication module further includes a communication interface.

In some embodiments of the system, the appliance comprises at least one of a galley component, a seating component, a light, a plumbing device, or an oxygen system.

In some embodiments of the system, the appliance includes at least one of an oven, a microwave, a beverage maker, a refrigerator, a water heater, or a trash compactor.

In some embodiments of the system, the ADS-B data is combined with the log data to create a combined data.

In some embodiments of the system, the system is further configured to receive chronological data, wherein the chronological data is correlated with the ADS-B data, wherein the ADS-B data is then time-stamped based on the chronological data.

In some embodiments of the system, the chronological data is derived from a data source.

In some embodiments of the system, the data source includes a remote server.

A method for combining log data generated by an appliance associated with an aircraft with flight data transmitted from the aircraft is also disclosed. In one or more embodiments, the method includes receiving an automatic dependent surveillance-broadcast (ADS-B) signal, wherein the ADS-B signal is received by a communication module communicatively coupled to the appliance, wherein the ADS-B signal is transmitted from the aircraft. In embodiments, the method further includes processing the ADS-B signal into a digitized data signal. In embodiments, the method further includes correlating the digitized data signal with the log data.

In some embodiments of the method, the appliance is configured within a galley.

In some embodiments of the method, the appliance includes at least one of an oven, a microwave, a beverage maker, a refrigerator, a water heater, or a trash compactor.

In some embodiments of the method, the appliance includes a seating component, a light, a plumbing device, or an oxygen system.

In some embodiments of the method, the method further includes combining the digitized data signal with the log data to create a combined data.

In some embodiments of the method, the method further includes correlating the combined data with chronological data, wherein the combined data is timestamped based on the chronological data.

In some embodiments of the method, chronological data is derived from a data source.

In some embodiments of the method, data source includes a remote server.

In some embodiments of the method, the method further includes correlating the digitized data signal and the log data with chronological data.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Many appliances on-board an aircraft are capable of maintaining a log that records appliance use and error messages. For example, a coffee maker may keep a log of how many cleaning cycles it has performed. In another example, an espresso maker may record an error message generated by the malfunction of a valve. These logs are useful for technicians to fix and maintain these appliances when the need arises.

While appliance logs provide pertinent information for technicians, the logs typically do not contain information pertaining to the appliance environment. For example, a technician may want to know if the appliance malfunctioned during a flight that had considerable turbulence. In another example, the technician may want to know if the appliance previously had been installed in different aircraft. Knowledge of the appliance's environment and past-history may be helpful in determining the cause of an appliance malfunction and may assist in preventing future malfunctions.

One possible solution is an add-on component for aircraft that would specifically send aircraft details and/or a time-stamp directly to the appliance. However, such system would require additional infrastructure (e.g., through a retrofit) and would likely be too expensive. Another possible solution would be to have these appliances receive time and location information from a GPS signal, with identification data of the aircraft coming from a different data source. However, GPS signals may be too weak to be received by appliances inside the aircraft.

Accordingly, embodiments of the present disclosure are directed to a system and method which cure one or more of the shortfalls of the previous approaches identified above. Embodiments of the present disclosure are directed to a system and method for using automatic dependent surveillance-broadcast (ADS-B) signals generated by the aircraft to supply additional information to the appliance. Once received by a receiver communicatively coupled to the appliance, the ADS-B signal is converted into digital data that may be stored for later use. Information from other data sources (e.g., a server or website accessed by a technician in a repair shop) may also be used to complement the data from the ADS-B signal, giving a comprehensive view of the environment, past-history, and other aspects of the appliance.

Figure 1:
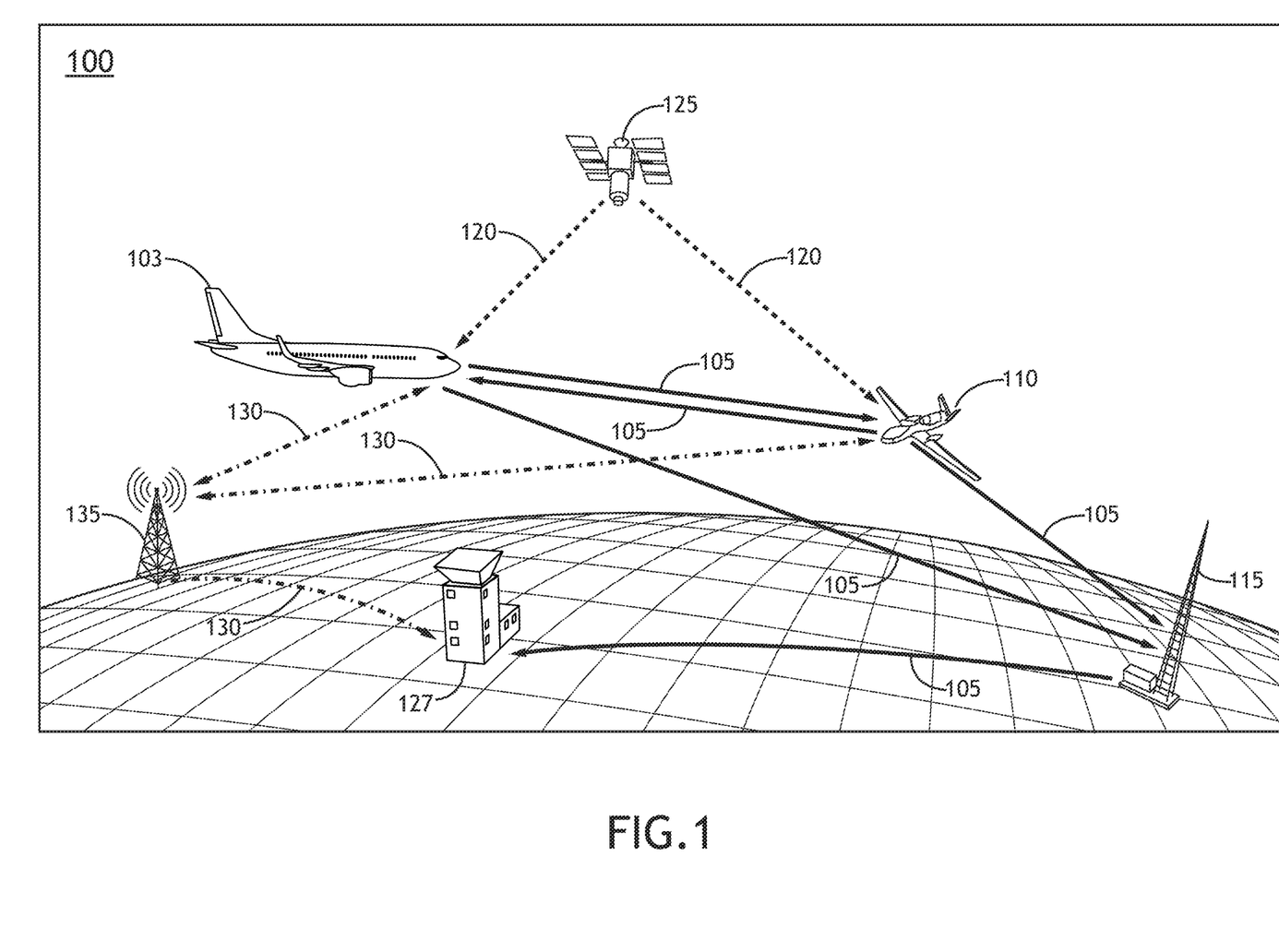
FIG. 1 illustrates a diagram of an aircraft signaling network configured to utilize ADS-B, in accordance with one or more embodiments of the present disclosure.

FIG. 1 illustrates a diagram of an aircraft signaling network 100 configured to utilize ADS-B, in accordance with one or more embodiments of the present disclosure. ADS-B is a surveillance technology that allows an aircraft to determine its position via satellite navigation and broadcast a signal detailing its position and other information to other parties (e.g., other aircraft or air traffic control networks). For example, the aircraft signaling network 100 may include an aircraft 103 (e.g., a commercial aircraft) sending out an ADS-B signal 105 to a nearby aircraft 110, or a ground-based ADS-B receiver 115. The ADS-B signal 105 sent by the aircraft 103 may contain location/position coordinates that were originally sent to the aircraft 103 as a Global Positioning System (GPS) signals 120 sent by satellite 125. At the same time, the nearby aircraft 110 may also be receiving GPS signals 120 from satellite 125, and sending an ADS-B signal 105 based on the GPS signal 120 to the aircraft 103 and the ground-based ADS-B receiver 115. The ground-based ADS-B receiver 115 may then relay the ADS-B signal 105 to an air traffic control tower 127. ADS-B signals 105 may be further defined as signals transmitted from an aircraft 103 (ADS-B out) and signals received by an aircraft (ADS-B in). In this disclosure, all ADS-B signals 105 will refer to ADS-B out signals.

The aircraft signaling network 100 may also be configured to use other signaling surveillance methods. For example, the aircraft signaling network may be configured to utilize automatic dependent surveillance-contact (ADS-C) signals 130. ADS-C signals 130 are automatically sent back and forth between the aircraft 103 and the ground (e.g., a surveillance radar 135) and includes information such as aircraft position, altitude, speed, elements of navigational intent and meteorological data. Once received on the ground, ADS-C signals may be relayed to the air traffic control tower 127 or other entity.

Figure 2:
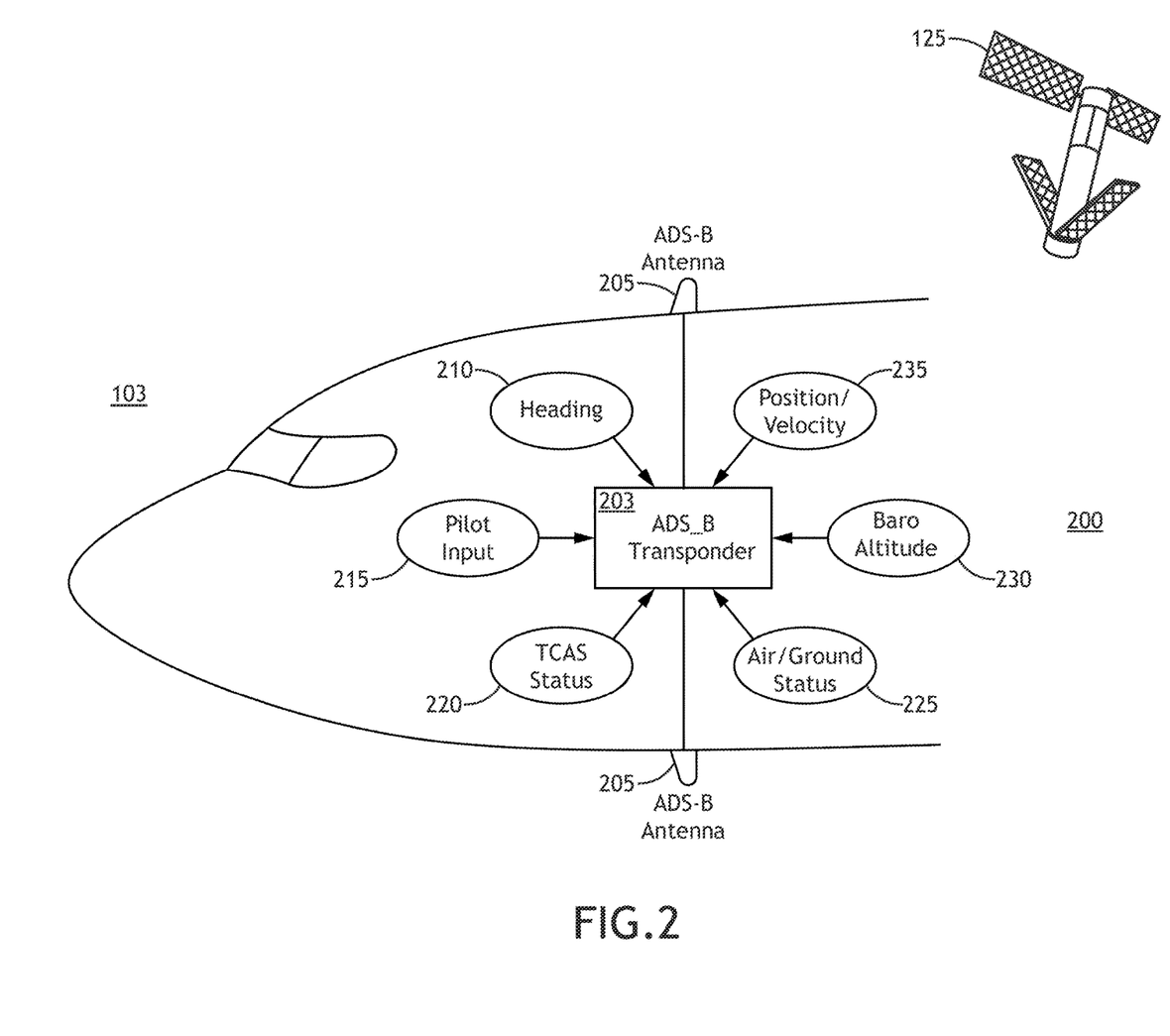
FIG. 2 illustrates a diagram of an ADS-B signaling unit of an aircraft in accordance with one or more embodiments of the present disclosure.

FIG. 2 illustrates a diagram of an ADS-B signaling unit 200 of an aircraft 103 in accordance with one or more embodiments of the present disclosure. The ADS-B signaling unit 200 is configured to receive data from the aircraft 103 via an ADS-B transponder 203 and transmit a generated ADS-B signal 105 from the ADS-B antenna 205. The generated ADS-B signal 105 may contain several types of data including but not limited to heading data 210, pilot input data 215, traffic collision avoidance system (TCAS) status data 220, air/ground status data 225, altitude data 230 (e.g., from a barometric altimeter), and position/velocity data 235. The position/velocity data 235 is based on GPS signals 120 received from satellites 125.

Figure 3A:
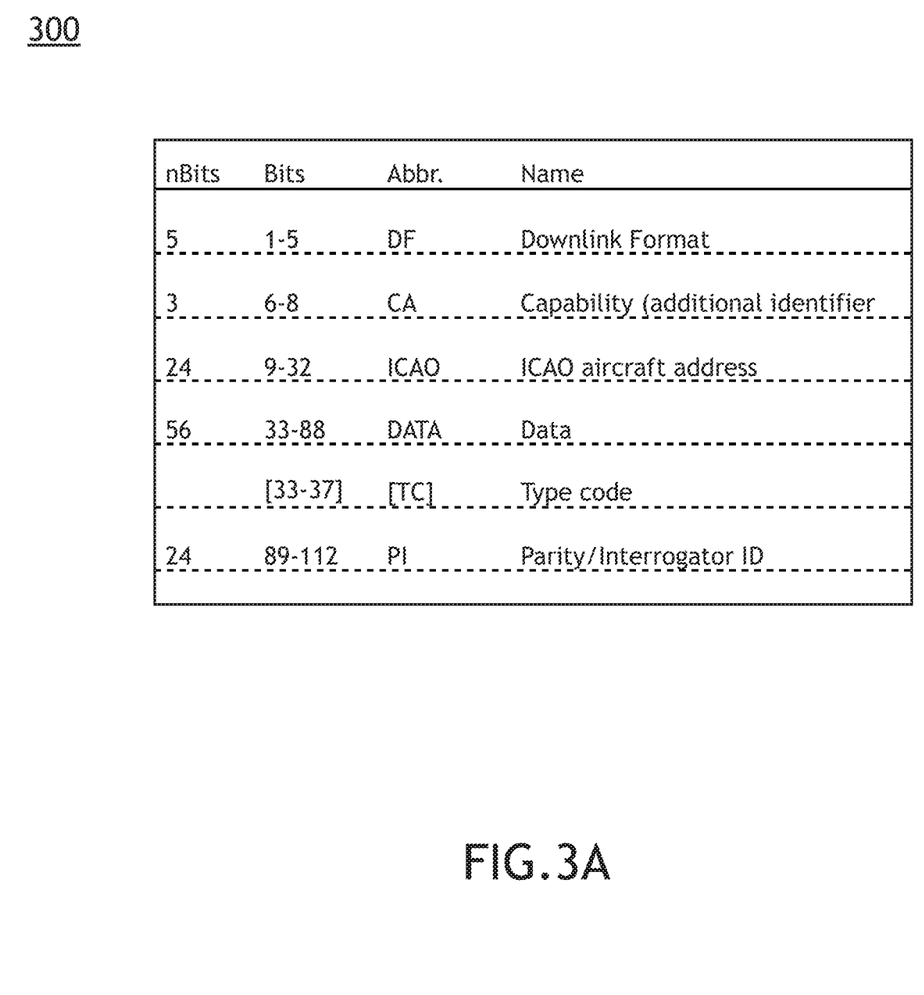
FIG. 3A illustrates a table depicting the structure of an ADS-B signal, in accordance with one or more embodiments of the present disclosure.

FIG. 3A illustrates a table 300 depicting the structure of an ADS-B signal 105, in accordance with one or more embodiments of the present disclosure. ADS-signals 105 are 112 bits long and consist of five sections. The first section of the message is a downlink format number, indicating the type of transponder used in generating the ADS-B 105 signal. The next section is a capability field, used to indicate what kind of data will be included in the message (e.g., altitude data 230, position/velocity data 235). The next section is an International Civil Aviation Organization (ICAO) aircraft address field, which provides a unique identifier for each aircraft (i.e., each ADS-B transmitter for each address is assigned a unique identifier). The next section is the data section, which is may be divide further into two parts: a type code section that further designates the information to be transmitted, and the data field itself. The final section is a parity section used for error detection.

Figure 3B:
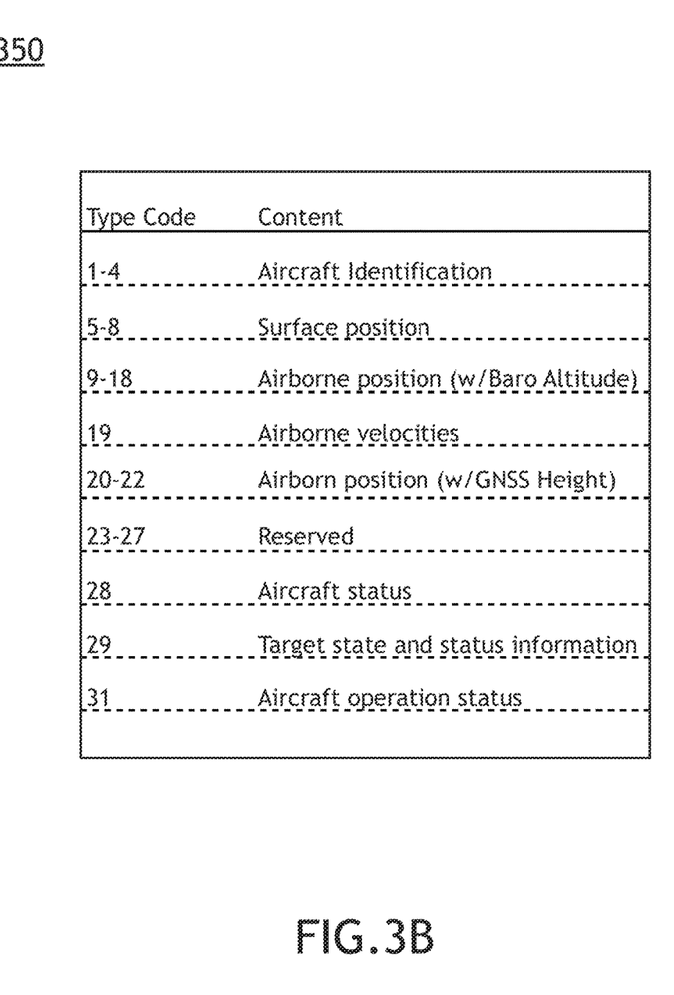
FIG. 3B illustrates a table of type codes for designating the content of the data section of an ADS-B message, in accordance with one or more embodiments of the present disclosure.

FIG. 3B illustrates a table 350 of type codes for designating the content of the data section of an ADS-B message, in accordance with one or more embodiments of the present disclosure. For example, a type code of three would indicate that the data section would include information relating to the identification of the aircraft. In another example, a type code of 19 would indicate that the data section would include information relating to the velocity of the aircraft. In this manner, the ADS-B message may broadcast to other aircraft and ground receiver information regarding position, velocity, altitude, and other information regarding the status and operation of the aircraft.

Figure 4:
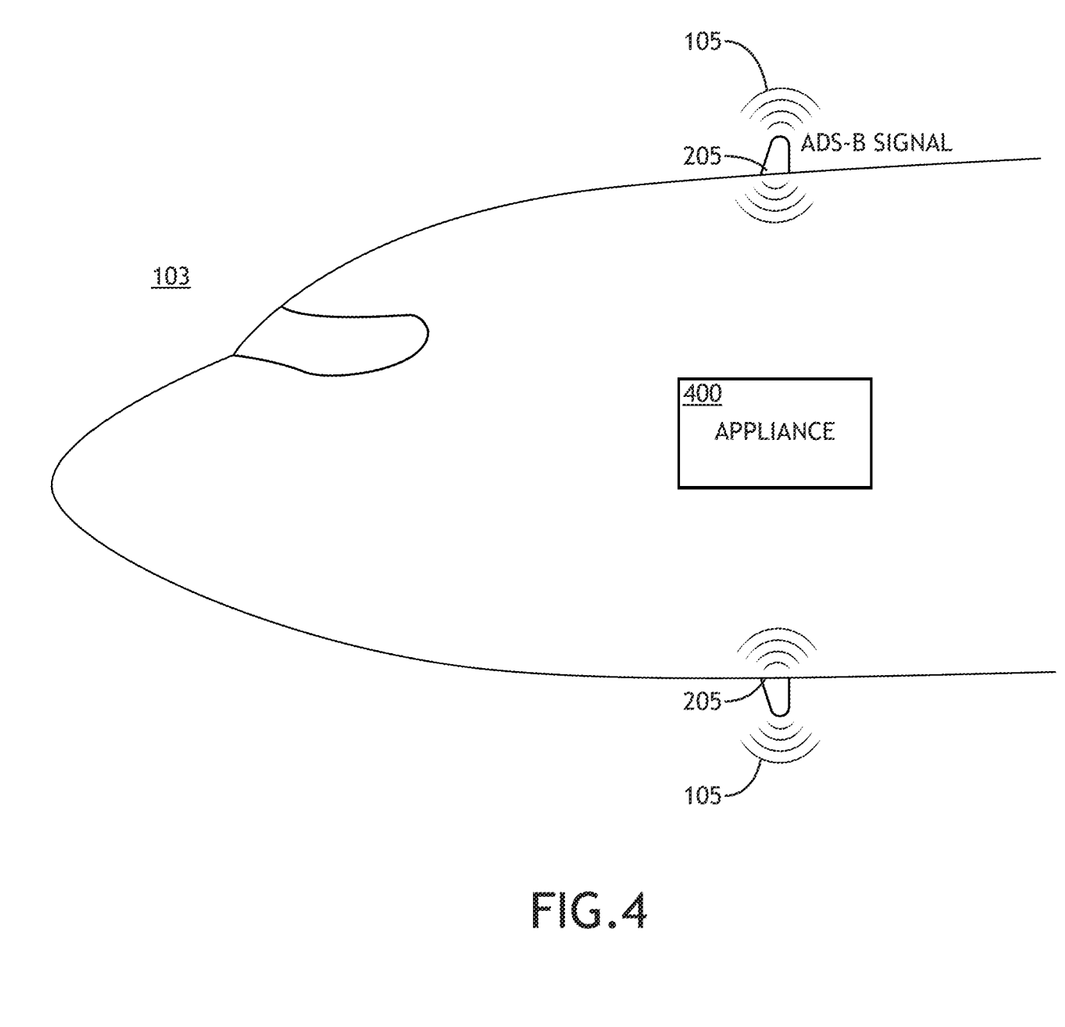
FIG. 4 illustrates a diagram of the transmission of an ADS-B signal transmitted by an aircraft that is received by an appliance located within the aircraft in accordance with one or more embodiments of the present disclosure.

FIG. 4 illustrates a diagram of the transmission of an ADS-B signal 105 transmitted by an aircraft 103 that is received by an appliance 400 located within the aircraft 103 in accordance with one or more embodiments of the present disclosure. ADS-B signals 105 are intended to be transmitted outward from the aircraft 103 via one or more ADS-B antennas 205. For example, a strong ADS-B signal 205 is shown in FIG. 4 as solid curved lines emanating from the outer surface of the aircraft 103. However, a weak ADS-B signal (e.g., the dotted curved lines inside the aircraft 103 in FIG. 4) enters the aircraft 103 as well. These ADS-B signals 105 that enter the aircraft are then capable of being received by aircraft (e.g., the oven) that are configured to receive ADS-B signals.

In embodiments, ADS-B signals may be received by any aircraft appliance known in the art. For example, the aircraft appliance may be a galley component (e.g., a galley insert). The galley component may include any galley component known to be included in a galley including but not limited to ovens, microwaves beverage makers, refrigerators, water heaters, or trash compactors. For instance, the ADS-B signal may be received by a microwave oven. In another instance, the ADS-B signal may be received by a convectional oven.

In another example, the aircraft appliance may be an entertainment device. The entertainment device may include any type of entertainment device known including but not limited to an entertainment system, a projector, a DVD player, a display, a television, or a computer. For instance, the ADS-B signal might be received by an in-seat display.

In another example, the aircraft appliance may be a seating component. Aircraft seats and other aircraft furniture often have electronic componentry that are used for physical adjustment (e.g., reclining function), entertainment or connectivity with entertainment devices, communication or connectivity with communication devices, and other functions. The electronic componentry associated with aircraft seating and other aircraft furniture may be capable of logging use data and would benefit from data provided by ADS-B signals 105. The aircraft seat and other aircraft furniture may include any types known including but not limited to a passenger seat, a table, a kiosk, and a serving bar. For instance, the ADS-B signal may be received by an electronically adjustable ottoman.

In another example, the aircraft appliance may be a light or a lighting system. Aircraft may have several lighting systems in place, with one or more lights or lighting systems equipped with data logging capability that would benefit from data provided by ADS-B signals 105. The lighting system may include any type of aircraft lighting known. For instance, the lighting or lighting system may include overhead lighting for individual passengers.

In another example, the aircraft appliance may include plumbing appliances (e.g., a plumbing device). Aircraft may have several plumbing fixtures that require electric or electronic components (e.g., pumps) that are equipped with data logging capability that would benefit from data provided by ADS-B signals 105. The plumbing equipment may include any type of plumbing equipment known including but not limited to a toilet, a lavatory faucet, or a garbage disposal.

In another example, the aircraft appliance may include an oxygen system. Aircraft may have an emergency oxygen system with electronic componentry and data logging capability that would benefit from data provided by ADS-B signals 105. Other passenger safety or comfort systems may also be communicatively coupled to ADS-signal data including but not limited to temperature maintaining systems and smoke alarm systems.

Figure 5A:
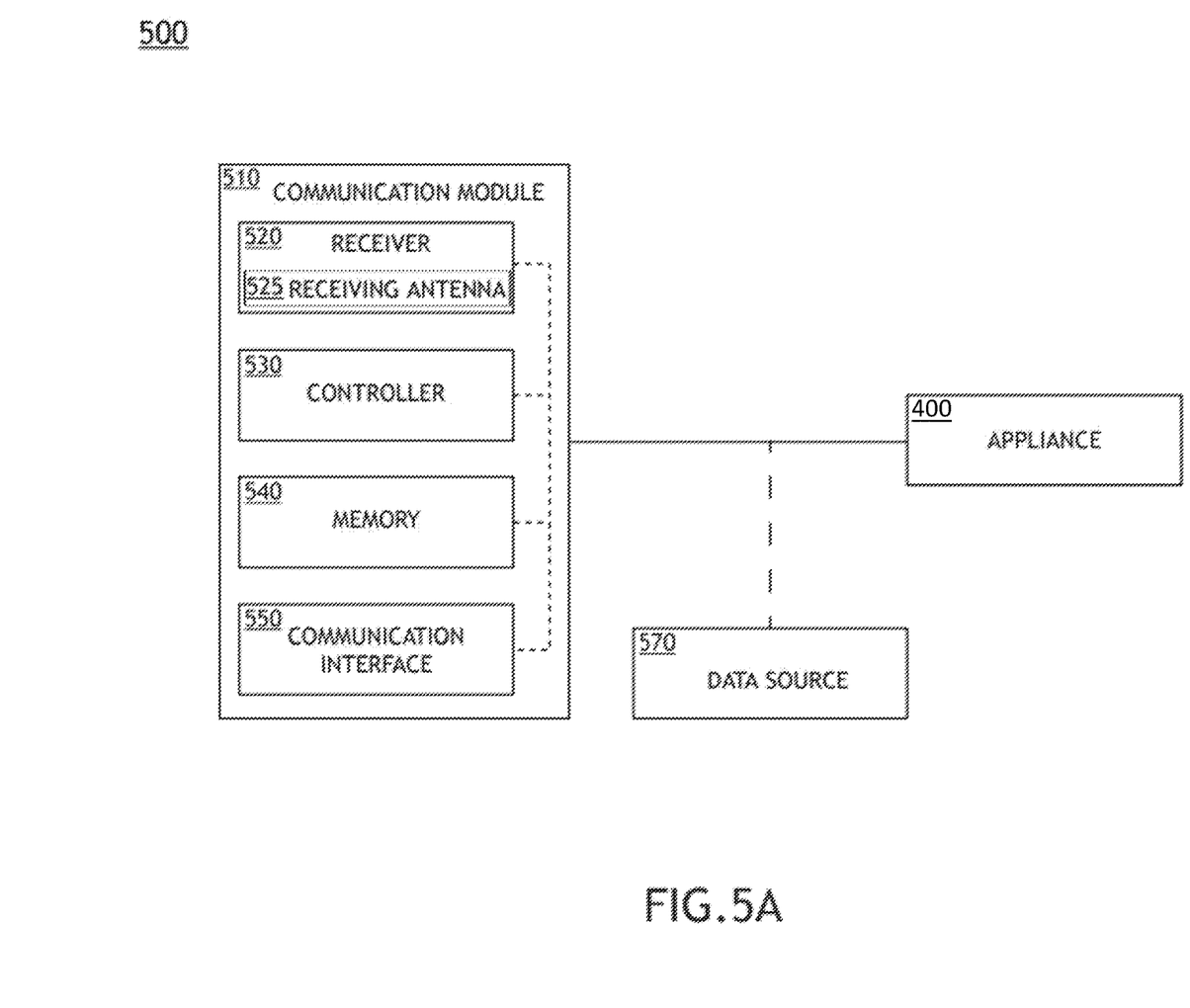
FIG. 5A illustrates a diagram of a system for an aircraft appliance configured to receive ADS-B signals, in accordance with one or more embodiments of the present disclosure.

FIG. 5A illustrates a diagram of a system 500 for an aircraft appliance configured to receive ADS-B signals 105, in accordance with one or more embodiments of the present disclosure. In embodiments, the system 500 includes the appliance 400. The appliance 400 may be any device or piece of equipment designed to perform a specific task within an aircraft 103. The appliance 400 may include any appliance described herein.

In embodiments, the system 500 further comprises a communication module 510 communicatively coupled to the appliance 400. The communication module 510 is configured to receive ADS-B signals 105, modify the ADS-B signals 105 into a machine-readable data (e.g., digital), and store the data for later use. The communication module 510 may be physically coupled to the appliance 400. For example, the communication module 510 may be enclosed inside the cabinet (e.g., a metal casing) of the appliance 400. In another example, the communication module 510 may be adhered to the outside of the cabinet of the appliance 400 (e.g., bolted to metal casing of the appliance 400). The communication module 510 may be communicatively coupled to the appliance via a wired or wireline connection. In embodiments, the communication module 510 may include a receiver 520, a receiving antenna 525, a controller 530, a memory 540, and/or a communication interface 550.

The controller 530 provides processing functionality for at least the communication module 510 and can include any number of processors, micro-controllers, circuitry, field programmable gate array (FPGA) or other processing systems, and resident or external memory for storing data, executable code, and other information accessed or generated by the communication module 510. The controller 530 can execute one or more software programs embodied in a non-transitory computer readable medium (e.g., memory 540) that implement techniques described herein. The controller 530 is not limited by the materials from which it is formed or the processing mechanisms employed therein and, as such, can be implemented via semiconductor(s) and/or transistors (e.g., using electronic integrated circuit (IC) components), and so forth.

The memory 540 can be an example of tangible, computer-readable storage medium that provides storage functionality to store various data and/or program code associated with operation of the communication module 510, the receiver 520, and/or the controller 530, such as software programs and/or code segments, or other data to instruct the controller 530, and possibly other components of the communication module 510, to perform the functionality described herein. Thus, the memory 540 can store data, such as a program of instructions for operating the communication module 510, including its components (e.g., controller 530, communication interface 550, etc.), and so forth. The memory 540 may also store data derived from the ADS-B signal 105. It should be noted that while a single memory 540 is described, a wide variety of types and combinations of memory 540 (e.g., tangible, non-transitory memory) can be employed. The memory 540 can be integral with the controller 530, can comprise stand-alone memory, or can be a combination of both. Some examples of the memory 540 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 550 can be operatively configured to communicate with components of the communication module 510 and the system 500 (e.g., the appliance 400). For example, the communication interface 550 can be configured to retrieve data from the controller 530 or other devices (e.g., the appliance 400), transmit data for storage in the memory 540, retrieve data from storage in the memory 540, and so forth. The communication interface 550 can also be communicatively coupled with the controller 530 to facilitate data transfer between components of the communication module 510 and the controller 530. It should be noted that while the communication interface 550 is described as a component of the communication module 510, one or more components of the communication interface 550 can be implemented as external components communicatively coupled to the communication module 510 via a wired and/or wireless connection. The communication module 510 can also include and/or connect to one or more input/output (I/O) devices. In embodiments, the communication interface 550 includes or is coupled to a transmitter, receiver, transceiver, physical connection interface, or any combination thereof.

It is contemplated herein that the communication interface 550 of a communication module 510 may be configured to communicatively couple to additional communication interfaces 550 of additional communication modules 510, appliances 400 and/or systems 500 using any wireless communication techniques known in the art including, but not limited to, GSM, GPRS, CDMA, EV-DO, EDGE, WiMAX, 3G, 4G, 4G LTE, 5G, WiFi protocols, radio frequency (RF), LoRa, Zigbee, Bluetooth, NFC, and the like.

In embodiments, the controller 530 and/or receiver 520 of a communication module 510 is configured to carry out various steps and functions of the present disclosure. The controller 530 and/or receiver 520 may be configured to amplify an analog signal (e.g., the ADS-B signal 105), filter the analog signal, and convert the analog signal into a digital signal). The controller and/or receiver 520 may also be configured to filter a digital signal, demodulate the digital signal, decode the digital signal, and send the decoded digital signal to a memory 540.

In some embodiments, the system includes a data source 570. The data source 570 provides data to the system 500 that is not provided by the ADS-B signal 105. In some embodiments, the data source 570 may be a database stored remotely (e.g., on a remote server). For instance, the data source 570 may be a database stored remotely by a $3^{rd}$ party that may be accessed through an internet browser. Alternatively, the data source may be a hard-drive located within the aircraft. The data source 570 may provide any type of data including but not limited to chronological data or environmental data. For example, the data source 570 may provide timestamps that allow the system 500 to calculate, determine, and/or report the timing of ADS-B signals 105 as these signals generally do not have a time stamp. In another example, the ADS-B signal may provide weather data. The data source 570 may be communicatively coupled to the system via wireless or wireline connections. The data source 570 may be communicatively coupled to the system 500 within the aircraft 103. The data source 570 may be communicatively coupled to the system 500 when the appliance 400 is not within the aircraft 103. For example, the data source 570 may be communicatively coupled to the appliance 400 and/or communication module 510 when the appliance 400 is relocated to a technician bay for maintenance.

The data source 570 may take the form of any database including but not limited to a physical database located within the aircraft 103 or technician bay. For example, the data source 570 may be a standalone hard-drive or server. The data source 570 may also be accessed via an internet or intranet link. For example, the system 500 may access a data source 570 configured as a website that compiles flight data, allowing the system 500 to correlated timestamps with ADS-B signals 105. The website may be any website that offers flight data. For example, the data source 570 may be the website from FlightAware. Flight data websites have large datasets containing ADS-B data which include the time that the ADS-B data was received. By searching though specific details of the flight data within the website, such as GPS coordinates, and the timestamp that the ADS-B signal 105 was broadcast with the GSP coordinate, the ADS-B signal 105 can be matched with the logged data of the appliance 400. For times when GPS data alone may not be sufficient to match data source 570 data with logged data from the appliance 400, multiple data points and/or different types of data may be extracted from the data source 570 and used to reconstruct an estimated time for the logged data on the appliance 400.

In embodiments, the coordination/matching of ADS-B signal 105 data received from the aircraft 103 and the ADS-B data and timestamps from the data source 570 may be accomplished by one or more components of the system 500 (e.g., the controller 530, the appliance 400, or the data source 570). Alternatively, the coordination/matching of ADS-B signal 105 data received from the aircraft 103 and the ADS-B data and timestamps from the data source 570 may be accomplished by an external device. For example, a technician may extract ADS-B data from the communication module 510, and data from the data source 570, and store and analyze the data on a computer. Any combination of system 500 components and non-system components may be used to for coordination/matching of the ADS-B data.

In embodiments, the coordination of ADS-B data (e.g., from the communication module 510 and/or the data source 570) with logged data from the appliance 400 may be accomplished by one or more components of the system 500 (e.g., the controller 530, the appliance 400, or the data source 570). Alternatively, the coordination/matching of ADS-B signal 105 data received from the aircraft 103 and the ADS-B data and timestamps from the data source 570 may be accomplished by an external device. For example, a technician may extract ADS-B data from the system 500 and logged data from the appliance 400, and store and analyze the data on a computer. Any combination of system 500 components and non-system components may be used to for coordination/matching of ADS-B data with logged data from the appliance 400.

Figure 5B:
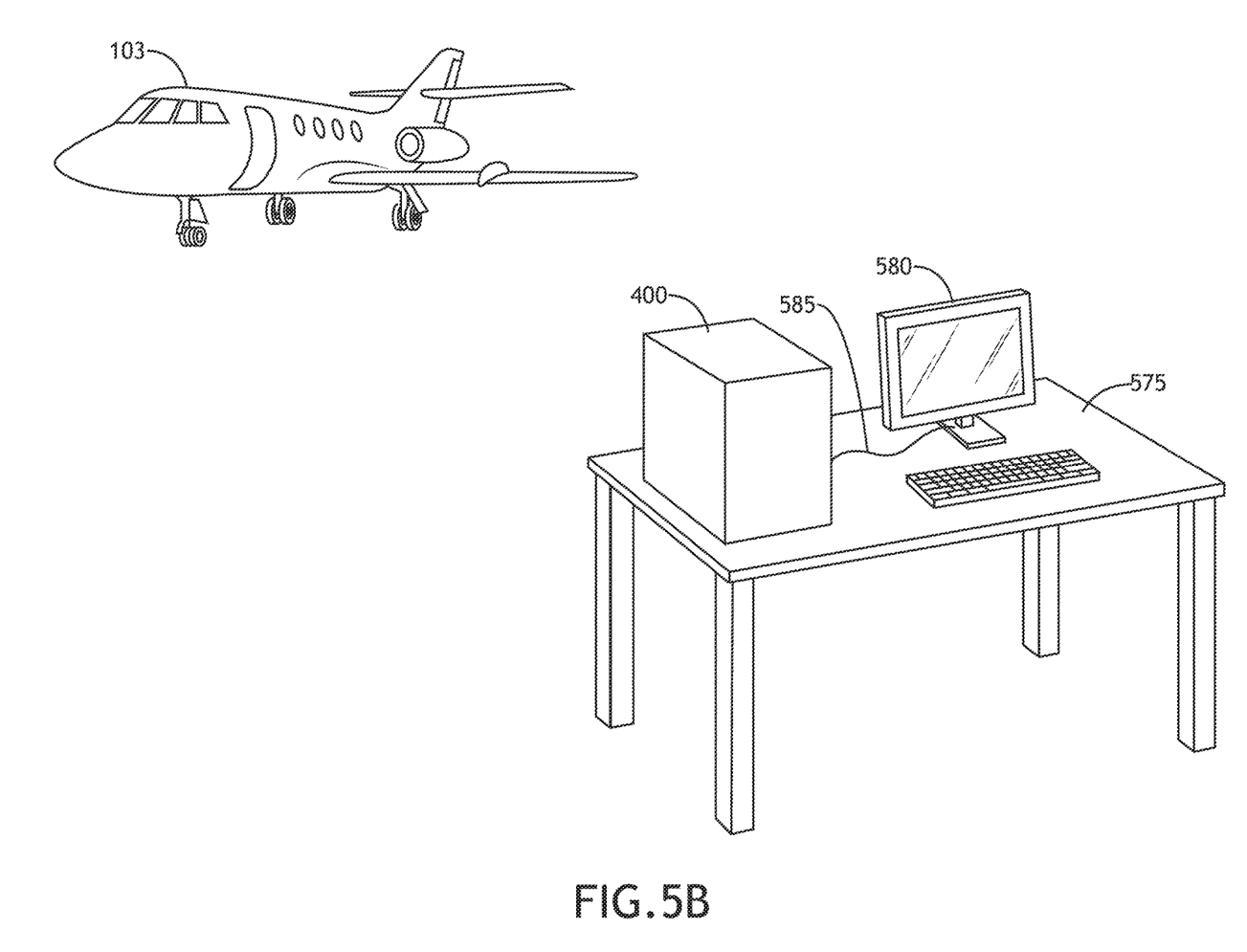
FIG. 5B illustrates a diagram of a system for an aircraft appliance configured to receive ADS-B signals, wherein the appliance is undergoing maintenance, in accordance with one or more embodiments of the present disclosure.

FIG. 5B illustrates a diagram of a system for an aircraft appliance configured to receive ADS-B signals, wherein the appliance is undergoing maintenance, in accordance with one or more embodiments of the present disclosure. In embodiments, the combining of data from the data source 270 with data from the aircraft (e.g., the log data and/or the ADS-B signal data) occurs outside of the aircraft (e.g., at a workbench 575). For example, the appliance 400 may be removed from the aircraft 103 and placed on the workbench 575. The workbench 575 may include several tools for performing maintenance on the appliance including but not limited to a computer 580. For example, the computer 580 may be configured to access the data source 570 containing chronological data that enables the system 500 to determine an absolute time when an ADS-B signal 105 recorded by the system 500 was sent. In another example, the computer 580 may be configured to analyze data retrieved from the data source 570 as well as log data and ADS-B signal data retrieved from the appliance 400 (e.g., via the data bus 585) and, using software and the processing capabilities of the computer 580, determine the absolute time when an ADS-B signal 105 recorded by the system 500 was sent. The workbench 575 may utilize one or more computers 580 for the access, retrieval, analysis, and outputting of data for the system 500.

It should be understood that chronological data comprises data with a reportable absolute time (e.g., a timestamp). As described herein, ADS-B signals 105 and log data from many appliances 400 do not have a timestamp and are therefore not capable of determining absolute time for an occurrence (e.g., an ADS-B signal reporting a GPS coordinate or an appliance 400 error message). For example, ADS-B transponders 203 and/or appliances 400 may only have a relative timestamp that resets when the ADS-B transponders 203 and/or appliances 400 are powered up. The chronological data provided by the data source 570 (e.g., containing timestamped ADS-B signal data) may be correlatable with aspects of data from the aircraft 103 ADS-B signal 105 (e.g., GPS coordinates), allowing a timestamp to be assigned to the aircraft 103 ADS-B signal 105 and/or the log data from the appliance.

It should also be understood that ADS-B signal data, once placed into the memory 540 of the system 500 may be configured as log data from the appliance 400 (e.g., the ADS-B signal data and the log data are combined into a combined data). For example, the chronological data provided by the data source 570 may be correlatable with aspects of log data from the appliance 400 (e.g., containing the aircraft 103 ADS-B signal 105). Therefore, the above description should not be considered a limitation of the present disclosure, but merely an illustration.

Figure 6:
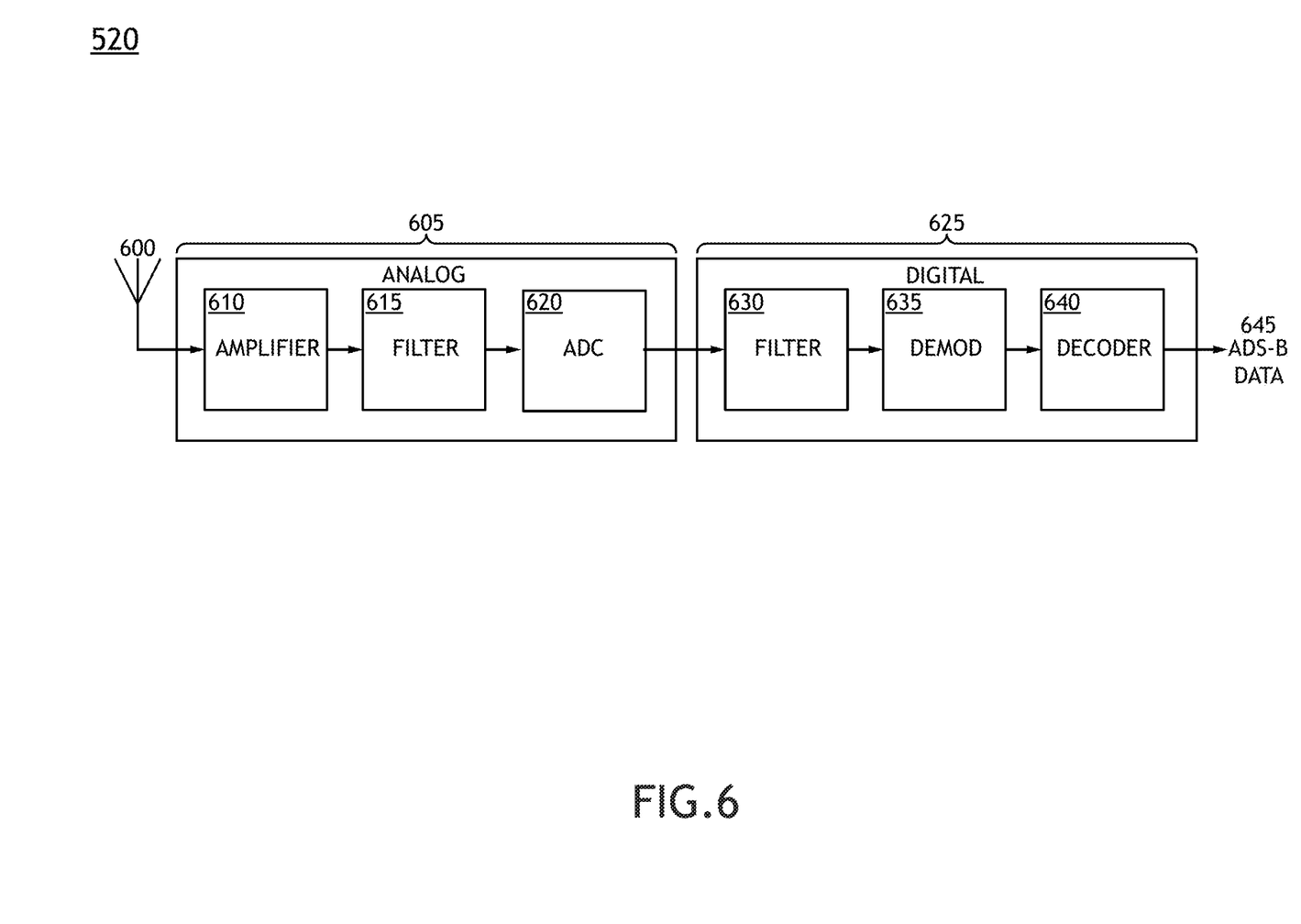
FIG. 6 illustrates a diagram of an ADS-B receiver in accordance with one or more embodiments of the present disclosure.

FIG. 6 illustrates a diagram of an ADS-B receiver 520 in accordance with one or more embodiments of the present disclosure. The receiver 520 receives the ADS-B signal 105 via a receiving antenna 525 and converts the ADS-B signal 105 into an ADS-B data stream 645. The receiving antenna 525 may be any type of antenna known in the art including but not limited to a surface mounted antenna (SMD). The receiving antenna 525 may be considered either a stand-alone component of the system 500 or a component of the receiver 520 In embodiments, the receiver 520 comprises an analog module 605 for transforming and/or modifying the ADS-B signal 105. The analog module 605 may include an amplifier 610. The amplifier 610 may include any device known in the art capable of amplifying an ADS-B signal. The analog module 605 may also include an analog filter 615 to filter out unwanted signal. The analog filter 615 may include any filter known in the art capable of filtering an analog signal. The analog module 605 may also include an analog-digital converter (ADC 620) to convert the ADS-B analog signal to a digital signal. The ADC 620 may include any ADS converter known in the art to convert an analog signal to a digital signal. It should be known that ADS-B receivers are commercially available, such as the Pro Stick™ vended by the FlightAware company.

In embodiments, the receiver 520 comprises a digital module 525 for transforming and/or modifying the digitized ADS-B signal 105. The digital module 525 may include a digital filter 630. The digital filter 630 may include any type of filter known capable of filtering a digital signal. The digital module may include a demodulator 635 configured to recover information content from the digital signal. The demodulator 635 may include any type of demodulator 635 known in the art capable of demodulating the digital signal. The digital module may include a decoder 640 configured to covert binary information from the digital signal into a signal capable of being analyzed by downstream componentry. The decoder 640 may include any componentry known in the art capable of decoding a digital signal. The componentry of the digital module 525 may be configured as a chip and/or circuit board. For example, the digital module 525 may be configured as a field programmable gate array (FPGA). In another example, the digital module 525 may be configured as a digital signal processor (DSP).

It should be understood that one or more components or the receiver 520, or one or more actions of one or more components of the receiver 520, may be accomplished by the controller 530. For example, the controller 530 may be configured to comprise the decoder 640. Therefore, the above description should not be interpreted as a limitation of the present disclosure, but merely an illustration.

Figure 7:
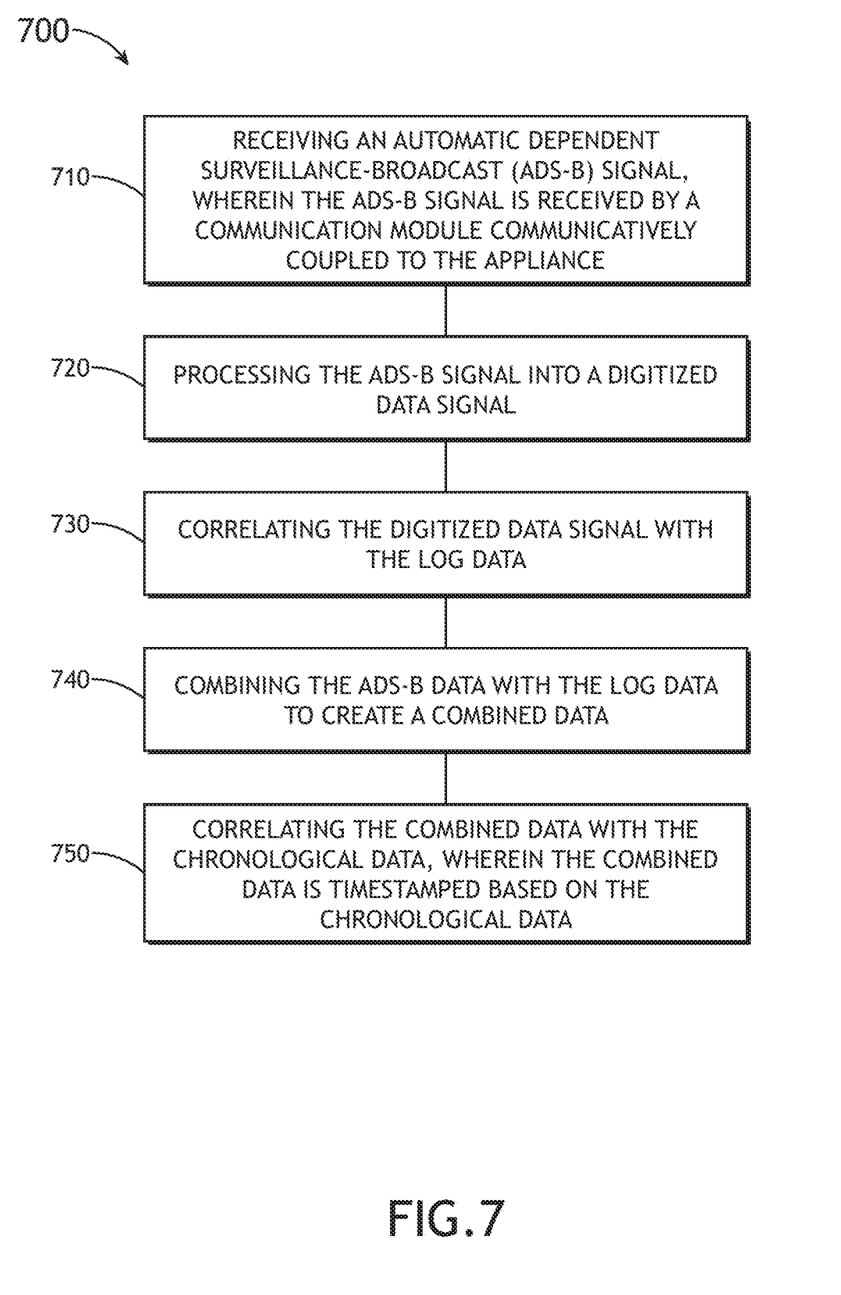
FIG. 7 is a flowchart illustrating a method for combining data from ADS-B signals transmitted from an aircraft with log data generated by the appliance associated with the aircraft, in accordance with one or more embodiments of the present disclosure.

FIG. 7 is a flowchart illustrating a method 700 for combining data from ADS-B signals 103 (e.g., flight data) transmitted from an aircraft 103 with log data generated by the appliance 400 associated with the aircraft 103, in accordance with one or more embodiments of the present disclosure. The method 700 includes a step 710 of receiving the ADS-B signal, wherein the ADS-B signal 105 is received by a communication module 510 communicatively coupled to the appliance 400. The method 700 further includes a step 720 of processing the ADS-B signal 105 into a digitized data signal. For example, the ADS-B signal may be processed by the analog module 605 and the digital module 625 of the receiver 520.

In embodiments, the method 700 further includes a step 730 of correlating the digitized data signal with the log data. The correlation between the digitized data signal and the log data may be accomplished via components of the system of 500 or the computer 580. In embodiments, the method 700 includes a step 740 of combining the ADS-B data with the log data to create a combined data. In embodiments, the method 700 includes a step 750 of correlating the combined data with the chronological data, wherein the combined data is timestamped based on the chronological data. In this manner, the log data from the appliance 400 (e.g., error messages) may be correlated with events or information derived from ADS-B signals 105 (e.g., a GPS coordinate) transmitted from the aircraft 103, with the timing of these events (e.g., the error message and the GPS coordinate) corroborated by chronological data provided by the data source 570.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

It should be understood that this disclosure is not limited to the particular methodology, protocols, and reagents, etc., described herein and as such may vary. The terminology used herein is for the purpose of describing particular embodiments only, and is not intended to limit the scope of the present disclosure. It is also to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A system comprising:
an appliance configured for use in an aircraft, wherein the appliance comprises log data associated with operation of the appliance; and
a communication module communicatively coupled to the appliance configured to receive automatic dependent surveillance-broadcast (ADS-B) signals from the aircraft and send ADS-B data to the appliance, the communication module comprising:
a receiving antenna;
a receiver configured to receive the ADS-B signal and process the ADS-signal into the ADS-B data, wherein the ADS-B data is configured as a digitized output; and
a communication interface;
wherein the communication module is configured to correlate the digitized output with the log data to create combined data; and
wherein the appliance comprises at least one of a galley component, a seating component, a light, a plumbing device, an oxygen system, an oven, a microwave, a beverage maker, a refrigerator, a water heater, and a trash compactor.

2. The system of claim 1, wherein the system is further configured to receive chronological data, wherein the chronological data is correlated with the ADS-B data, wherein the ADS-B data is then time-stamped based on the chronological data.

3. The system of claim 2, wherein the chronological data is derived from a data source.

4. The system of claim 3, wherein the data source comprises a remote server.

5. A method for combining log data generated by and associated with operation of
an appliance associated with an aircraft with flight data transmitted from the aircraft comprising:
receiving an automatic dependent surveillance-broadcast (ADS-B) signal, wherein the ADS-B signal is received by a communication module communicatively coupled to the appliance, wherein the ADS-B signal is transmitted from the aircraft;
processing the ADS-B signal into a digitized data signal; and
correlating the digitized data signal with the log data to create combined data; and
wherein the appliance comprises at least one of a seating component, a light, a plumbing device, an oxygen system, an oven, a microwave, a beverage maker, a refrigerator, a water heater, and a trash compactor.

6. The method of claim 5, wherein the appliance is configured within a galley.

7. The method of claim 5, further comprising correlating the combined data with chronological data, wherein the combined data is timestamped based on the chronological data.

8. The method of claim 7, wherein the chronological data is derived from a data source.

9. The method of claim 8, wherein the data source comprises a remote server.

* * * * *